United States Patent
Lee et al.

(10) Patent No.: US 11,915,268 B2
(45) Date of Patent: Feb. 27, 2024

(54) TRANSMEDIA STORY MANAGEMENT SYSTEMS AND METHODS

(71) Applicant: Nant Holdings IP, LLC, Culver City, CA (US)

(72) Inventors: Brian Elan Lee, Venice, CA (US); Michael Sean Stewart, Davis, CA (US); James Stewartson, Manhattan Beach, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 17/008,227

(22) Filed: Aug. 31, 2020

(65) Prior Publication Data

US 2020/0402102 A1 Dec. 24, 2020

Related U.S. Application Data

(63) Continuation of application No. 14/390,363, filed as application No. PCT/US2013/035160 on Apr. 3, 2013, now Pat. No. 10,922,721.

(60) Provisional application No. 61/619,716, filed on Apr. 3, 2012.

(51) Int. Cl.
*G06Q 30/02* (2023.01)
*G06F 16/13* (2019.01)
*G06Q 30/0251* (2023.01)
*G06Q 30/0241* (2023.01)

(52) U.S. Cl.
CPC ......... *G06Q 30/0264* (2013.01); *G06F 16/13* (2019.01); *G06Q 30/0241* (2013.01)

(58) Field of Classification Search
CPC ............ A63F 13/79; A63F 9/24; A63F 13/63; H04N 21/439; H04N 21/4788; G09B 5/067; G07F 17/3206; G06Q 30/02
See application file for complete search history.

(56) References Cited

U.S. PATENT DOCUMENTS

| | | | |
|---|---|---|---|
| 5,671,342 | A | 9/1997 | Millier et al. |
| 5,805,821 | A | 9/1998 | Saxena et al. |
| 6,341,316 | B1 | 1/2002 | Kloba et al. |
| 6,496,981 | B1 | 12/2002 | Wistendahl et al. |
| 7,810,021 | B2 | 10/2010 | Paxson |

(Continued)

FOREIGN PATENT DOCUMENTS

WO 2010099427 9/2010

OTHER PUBLICATIONS

Thomas, Shane, "International Search Report and Written Opinion," PCT Appln. No. PCT/US2013/035160, dated Aug. 2, 2013, 10 pages, ISA/US, Alexandria, VA.

(Continued)

*Primary Examiner* — Saba Dagnew
(74) *Attorney, Agent, or Firm* — STETINA BRUNDA GARRED AND BRUCKER (57) ABSTRACT

Transmedia scheduling systems and methods are described in which a user interface is generated via a channel engine that includes first and second channels. The channels are based on one or more channel templates stored in a channel database, and are preferably populated with concurrent transmedia stories. Each of the transmedia stories can be based on at least one transmedia object stored in a transmedia database and may be dynamically generated.

17 Claims, 4 Drawing Sheets

(56) References Cited

U.S. PATENT DOCUMENTS

| | | | |
|---|---|---|---|
| 8,135,505 B2 | 3/2012 | Vengroff et al. | |
| 8,191,001 B2 | 5/2012 | Van Wie et al. | |
| 8,326,327 B2 | 12/2012 | Hymel et al. | |
| 9,122,693 B2 | 9/2015 | Blom et al. | |
| 2003/0004802 A1 | 1/2003 | Callegari | |
| 2003/0056220 A1* | 3/2003 | Thornton | H04L 29/06027 |
| | | | 725/62 |
| 2007/0150891 A1 | 6/2007 | Shapiro | |
| 2007/0168861 A1* | 7/2007 | Bell | G06F 3/0481 |
| | | | 715/701 |
| 2008/0004990 A1 | 1/2008 | Flake et al. | |
| 2008/0102947 A1* | 5/2008 | Hays | A63F 13/79 |
| | | | 463/31 |
| 2008/0108406 A1* | 5/2008 | Oberberger | G07F 17/3206 |
| | | | 463/16 |
| 2008/0119132 A1* | 5/2008 | Rao | G06Q 30/02 |
| | | | 455/3.04 |
| 2008/0132251 A1 | 6/2008 | Altman et al. | |
| 2009/0019085 A1 | 1/2009 | Abhyanker | |
| 2009/0138333 A1 | 5/2009 | Jung et al. | |
| 2009/0254543 A1* | 10/2009 | Ber | G06F 16/334 |
| 2009/0254843 A1 | 10/2009 | Van Wie et al. | |
| 2010/0029382 A1 | 2/2010 | Cao | |
| 2010/0146436 A1 | 6/2010 | Jakobson et al. | |
| 2010/0257071 A1 | 10/2010 | Bokor et al. | |
| 2010/0273553 A1 | 10/2010 | Zalewski | |
| 2010/0332958 A1 | 12/2010 | Weinberger et al. | |
| 2011/0165939 A1* | 7/2011 | Borst | A63F 13/63 |
| | | | 463/29 |
| 2012/0004026 A1 | 1/2012 | Vann | |
| 2012/0005209 A1 | 1/2012 | Rinearson et al. | |
| 2012/0015722 A1* | 1/2012 | Mooney | A63F 9/24 |
| | | | 463/30 |
| 2012/0041825 A1* | 2/2012 | Kasargod | G06Q 30/02 |
| | | | 705/14.68 |
| 2012/0060101 A1* | 3/2012 | Vonog | H04N 21/4788 |
| | | | 715/751 |
| 2012/0072957 A1 | 3/2012 | Cherukuwada et al. | |
| 2012/0122570 A1* | 5/2012 | Baronoff | A63F 13/792 |
| | | | 463/31 |
| 2012/0150695 A1 | 6/2012 | Fan et al. | |
| 2012/0190446 A1* | 7/2012 | Rogers | A63F 13/60 |
| | | | 463/31 |
| 2012/0233347 A1 | 9/2012 | Lee et al. | |
| 2012/0236201 A1* | 9/2012 | Larsen | H04N 21/242 |
| | | | 348/468 |
| 2013/0330693 A1* | 12/2013 | Sada | G09B 5/067 |
| | | | 434/236 |
| 2013/0346452 A1 | 12/2013 | Lee et al. | |
| 2014/0046973 A1 | 2/2014 | Rinearson et al. | |
| 2014/0113718 A1* | 4/2014 | Norman | A63F 13/822 |
| | | | 463/31 |
| 2014/0188880 A1 | 7/2014 | Abhyanker | |
| 2014/0195650 A1* | 7/2014 | Kelsen | G06F 16/285 |
| | | | 709/219 |
| 2014/0236201 A1 | 8/2014 | Dehnad | |
| 2018/0046682 A1 | 2/2018 | Rinearson et al. | |
| 2018/0221772 A1 | 8/2018 | Hardee et al. | |

OTHER PUBLICATIONS

Final Office Action in U.S. Appl. No. 17/008,235 dated Jan. 11, 2022.
Final Office Action in U.S. Appl. No. 17/008,246 dated Jan. 26, 2022.
Advisory Action in U.S. Appl. No. 17/008,235 dated Apr. 6, 2022.
Advisory Action in U.S. Appl. No. 17/008,246 dated Apr. 14, 2022.
Non-Final Action in U.S. Appl. No. 17/008,246 dated May 10, 2022.
Non-Final Office Action in U.S. Appl. No. 17/008,235 dated May 19, 2022.
Final Action in U.S. Appl. No. 17/008,246 dated Aug. 19, 2022.
Final Action in U.S. Appl. No. 17/008,235 dated Sep. 21, 2022.
Notice of Allowance in U.S. Appl. No. 17/008,246 dated Nov. 2, 2022.
Non Final Office Action in U.S. Appl. No. 17/008,235 dated Jan. 12, 2023.
Notice of Allowability in U.S. Appl. No. 17/008,246 dated Jan. 20, 2023.
Notice of Allowability in U.S. Appl. No. 17/008,246 dated Jan. 30, 2023.
Final Office Action in U.S. Appl. No. 17/008,235 dated May 31, 2023.
Non-Final Office Action in U.S. Appl. No. 17/008,235 dated Aug. 16, 2021.
Non-Final Office Action in U.S. Appl. No. 17/008,246 dated Aug. 17, 2021.
Non Final Office Action in U.S. Appl. No. 17/008,235 dated Aug. 15, 2023.
Notice of Allowance in U.S. Appl. No. 17/008,235 dated Dec. 18, 2023.
Notice of Allowability in U.S. Appl. No. 17/008,235 dated Jan. 5, 2024.

* cited by examiner

TRANSMEDIA STORY MANAGEMENT SYSTEMS AND METHODS

This application is a continuation of U.S. patent application Ser. No. 14/390,363, filed on Oct. 2, 2014, now issued as U.S. Pat. No. 10,922,721, which claims priority to PCI International Application No. PCT/US2013/035160, filed Apr. 3, 2013, which claims the benefit of priority to U.S. provisional application with Ser. No. 61/619,716, filed on Apr. 3, 2012. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is systems and methods for transmedia story management.

BACKGROUND

The following background discussion includes information that may be useful in understanding the present invention. It is not an admission that any of the information provided herein is prior art or relevant to the presently claimed invention, or that any publication specifically or implicitly referenced is prior art.

Consumers seek out ever more immersive media experiences. With the advent of mobile computing, opportunities exist for integrating real-world experiences with immersive narratives bridging across a full spectrum of device capabilities. Rather than a consumer passively watching a television show or listening to an audio stream, the consumer can directly and actively engage with a narrative or story according to their own preferences.

Interestingly, previous efforts of providing immersive narratives seek to maintain a distinction between the "real-world" and fictional worlds. For example, U.S. Pat. No. 7,810,021 to Paxson describes attempts at preserving a reader's immersive experience when reading literary works on electronic devices. Therefore, Paxson seeks to maintain discreet boundaries between the real-world and functional world. Unfortunately, narratives presented according to such approaches remain static, locked on a single device, or outside the influence of the consumer.

U.S. Patent Publication No. 2010/0029382 to Cao (publ. February 2010) takes the concept of immersive entertainment slightly further. Cao discusses maintaining persistence of player-non-player interactions where the effects of an interaction persist over time. Such an approach allows for a more dynamic narrative. However, Cao's approach is still locked to a single device and fails to provide for real-world interactions with a consumer or other users.

Ideally, a consumer should be able to interact with a narrative or story as one would interact with the real-world, albeit through computing devices. For example, the consumer could call a character in a story via the character's cell phone, write a real email to a character, or otherwise actively interact with a story via real-world systems and devices. It has yet to be appreciated that a full transmedia user experience can be managed such that the experience can cross boundaries of media types or media devices while maintaining a synchronized event-triggered reality.

Thus, there is still a need for systems and methods for transmedia story management.

SUMMARY OF THE INVENTION

In one aspect, the inventive subject matter provides apparatus, systems and methods for a transmedia scheduling system in which one can manage a presentation of one or more channels that comprise concurrent stories. Contemplated systems can include a story database where at least one story object can be stored, and a channel database configured to store a plurality of channel templates. A channel engine can be used to generate a user interface having first and second channels. Preferred stories include transmedia stories having at least one real-world event.

In another aspect, transmedia event management systems and methods are contemplated, where a transmedia content database is configured to store transmedia content. A transmedia server can be coupled with the transmedia content database and configured to construct a transmedia progress bar having transmedia events based on at least some of the transmedia content. The transmedia server can be further configured to cause a transmedia player to render the transmedia progress bar concurrently with the transmedia content, and instruct the transmedia player to modify the transmedia progress bar upon detection of a completed transmedia event. Thus, in this manner, the transmedia progress bar can illustrate a user's progress in real-time including an illustration of completed and incomplete transmedia events.

In yet another aspect, systems and methods configured to generate and manage content for a transmedia story are contemplated. Preferred systems include a content database configured to store a plurality of raw content streams, and a content analysis engine coupled with the content database and configured to detect a transmedia event within a raw content stream. At least one transmedia content object associated with the transmedia event and the raw content stream can be constructed by the content analysis engine, and a transmedia story stream can be generated that includes the at least one transmedia content object and at least a portion of the raw content stream.

In still another aspect, systems and methods configured to facilitate user interaction with a transmedia story are contemplated that comprise a user database configured to store user information. A story engine can be communicatively coupled with a story database having one or more story streams, and configured to instruct at least one user media device to render a story stream according to a selected level of immersion. Using a user interface generated by a registration engine, a user can select a level of immersion for the story stream. In this manner, a user can vary a level of immersion as desired.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based transmedia management system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including automatic creation of channels that are populated with transmedia stories and advertising content, much of which preferably occurs automatically.

The following discussion provides many exemplary embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, it is contemplated that the term "user media device" can include, for example, desktops, laptops, netbooks, tablet PCs, and other computing devices, cell phones including smart phones, non-cellular telephones, video game systems, books, magazines, e-readers, newspapers, kiosks, GPS units, Mp3 or other music players, televisions, vehicles, and appliances.

Figure 1:
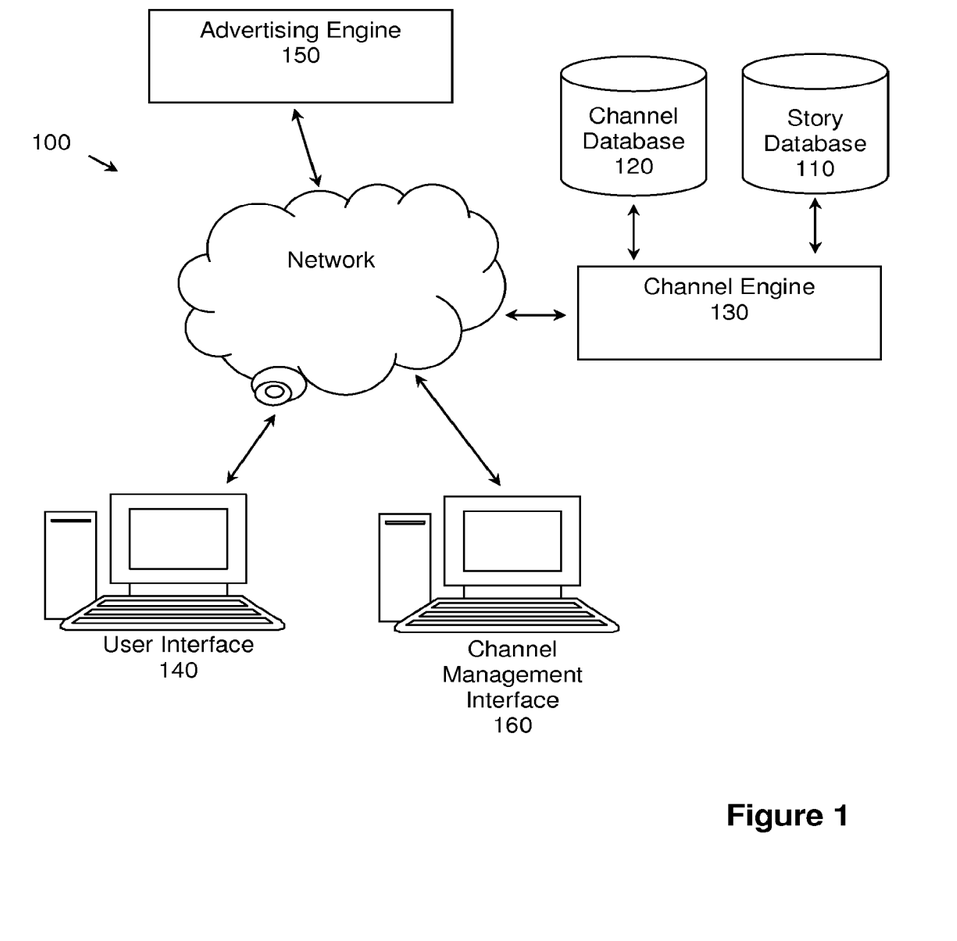
FIG. 1 is a schematic of one embodiment of a transmedia scheduling system.

FIG. 1 illustrates one embodiment of a transmedia scheduling system 100 that includes a transmedia story database 110 configured to store at least one story object, and a channel database 120 configured to store a plurality of channel templates.

Preferred systems include a channel engine 130 communicatively coupled to the story and channel databases 110 and 120 and configured to generate a user interface 140 having first and second channels from the channel templates. The first and second channels preferably comprise concurrent transmedia story objects or stories. Exemplary embodiments of transmedia stories are discussed in co-pending U.S. utility application having U.S. Patent Application Publication No. 2012/0233347, filed on Mar. 7, 2012, titled "Transmedia User Experience Engines", which is incorporated by reference herein. It is preferred that the channels comprises one or more story objects from which transmedia stories can be dynamically generated for a user when requested based on one or more factors including, for example, user preferences, user data, user location, user viewing history of other transmedia stories, and a user-selected immersion level.

The channel engine 130 could be configured to select one or more of the channel templates based on a predefined metric, and generate the user interface 140 with the first and second channels from the one or more channel templates. Each of the channels could include one or more transmedia story objects or a collection of related transmedia story objects, such as those having overlapping characters, the same genre, same owner, same licensee, and so forth. The at least one transmedia story object or collection of related transmedia story objects can be received from the story database 110. Thus, for example, transmedia story objects could be scheduled and presented much like a television show where chapters (episodes) are available at one or more timeslots each week or other period of time.

The channel engine 130 can be further configured to schedule one or more transmedia story objects in each of the first and second channels as a function of a time, for example. However, it is also contemplated that the story objects could be scheduled as a function of a user's preferences, a user's location, a time, a date, a user viewing history, user data, and so forth. Still further, the transmedia story objects could be scheduled in a playlist that is created by the user or dynamically generated by the channel engine, for example. In such embodiments, it is contemplated that the playlist could be generated based at least in part upon a user's preferences, time, date, and/or a user's location. Alternatively, one or more of the story objects of a channel could be accessed in an on-demand manner by a user.

The channels preferably each include content injection points and story injection points, which in some embodiments may be dynamically populated with transmedia story objects from the story database 110 and advertising or other paid content from an advertising database or other location, for example.

The transmedia scheduling system 100 can further include an advertising engine 150 that injects the advertising content within at least one of the first and second channels to thereby monetize the channels. Such advertising content could be injected between the transmedia story objects (e.g., a commercial break) or within a story object (e.g., product placement, use of green screens, etc.). In preferred embodiments, the advertising content can be dynamically injected into the channels based on at least one of the following: date, time, user location, user preferences, other user data, viewing history of the user including advertising content previously watched or skipped, social network data of the user including user opinions of companies (e.g., Facebook™ likes, etc.)

Preferred advertising content comprises transmedia content such as an interactive event, although any commercial content could be used including, for example, a commercial, a coupon, a map, a barcode, a telephone number, an email address, and a location photo. It is especially preferred that the interactive content comprises at least two types of media interactions including, for example, printing, faxing, texting, messaging, playing audio or video, making a phone call, emailing, receiving a voice mail, controlling a device, visiting a website, and changing a channel.

The channel engine 130 can advantageously be configured to identify the content injection points on the first and second channels, where content such as advertising or other commercial content can be injected. The channel engine can be further configured to identify the actual content to be injected at the identified content injection points, which may be based on one or more of the factors described above. Preferably, the injected content at a content injection point can be different from content injected at other content injection points especially that of neighboring points. The selected content could be chosen based on one or more factors including, for example, a user profile, a user location, a time, a date, a story object of the channel, user preferences, a user media device, previously viewed or skipped content, and so forth.

It is further contemplated that the channel engine 130 could be further configured to identify story injection points of a channel, and may identify the transmedia story objects to be injected into such injection points.

The at least one transmedia story object of the story database 110 can comprise various media, and preferably comprises an interactive game. It is especially preferred that the interactive game includes transmedia content or events, which can be used to increase a user's immersion within the game.

The user interface 140 preferably includes a transmedia player. It is currently preferred that the transmedia player uses HTML5, although Flash™, Java™, or any other commercially suitable codec or platform could be used. The transmedia player can be disposed on a user media device by way of a web browser, app or software, for example. By way of illustration, contemplated user media devices include, for example, a desktop computer, a laptop, a netbook, a tablet PC, or other portable computer, a cell phone, a non-cellular telephone, a video game system, a book, a magazine, an e-reader, a newspaper, a kiosk, a GPS unit, a television, a vehicle, and an appliance.

Using the user interface 140, it is contemplated that a user could browse at least one of the first and second channels to select one or more story objects. It is further contemplated that the user interface 140 could be configured to allow the user to subscribe to at least one of the channels, such that content could be automatically pushed or otherwise transmitted to one or more user media devices.

The system 100 can further include a channel management interface 160 that allows a manager to manage at least one of the channels. Preferably, such interface 160 is configured to restrict access to the channels to only those authorized managers. Thus, for example, a manager could only have access to those channels owned or produced by the manager or an affiliated company, and would not have access to competitors' channels. Any authentication processes or standards could be used including, for example, passwords, e-certificates, and so forth.

The channel management interface 160 can advantageously allow a manager to schedule channel content including one or more story objects on at least one of the channels. In some embodiments, the manager could also define content injection points using the management interface. This may occur prior to or after launch/creation of a channel.

In addition, advertisers could utilize the channel management interface 160 to bid or otherwise purchase advertising space for at least one of the content injection points. Of course, rather than bid for specific content injection points, it is also contemplated that advertisers could bid for advertising space that matches predefined criteria of the advertiser, such as user demographics, geographical areas, time, days, and so forth.

As an example, the channels could be generated on the user interface based on a user location. The location could be as specific as a user's IP address or postal code, but more likely will be based on a larger geographical area such as a city or county in the U.S. It is contemplated that each of the channels could include a set of transmedia story objects along with paid advertising contents or slots that can be dynamically filled with advertising or other paid content. Such content could be selected by an advertising engine or other component of system 100 based on one or more factors, which could include advertiser or user preferences, user location, viewing history including content and advertising viewing or skipping, and so forth.

From a story object in the channel, a transmedia story could be generated based on one or more of the factors described above, and can preferably be viewed on one or more of the user's media devices.

Figure 2:
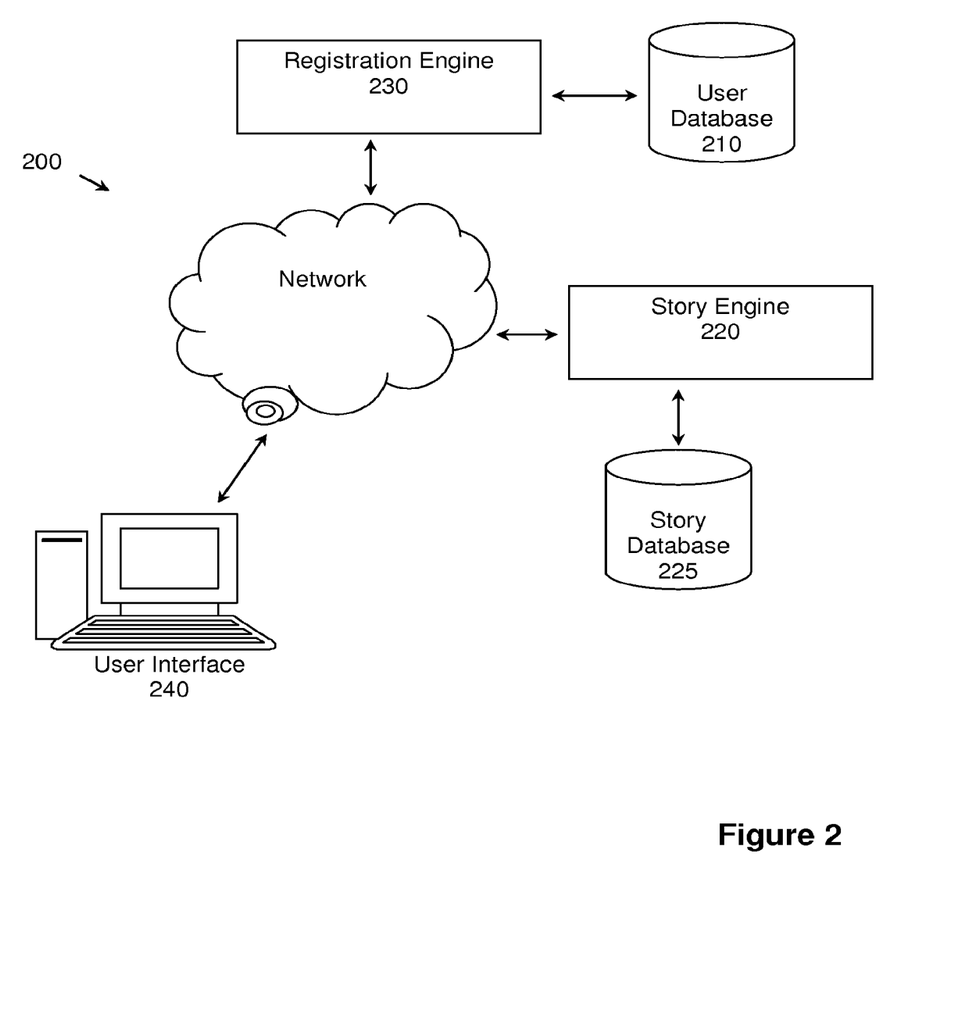
FIG. 2 is a schematic of one embodiment of a system configured to facilitate user interaction with a transmedia story.

In still other aspects, systems are contemplated that can be configured to facilitate user interaction with a transmedia story. An exemplary system 200 is shown in FIG. 2. Such systems can include a user database 210 where user information can be stored, and a story engine 220 communicatively coupled with a story database 225 having one or more story streams.

A registration engine 230 can be coupled with the story engine 220, and configured to generate a user interface 240 that allows a user to select a level of immersion for at least one story stream. Preferred levels of immersion include multiple dimensions of immersion. However, it is also contemplated that the level of immersion could comprise a substantially continuous level of immersion (e.g., volume). Alternatively, the registration engine 230 could automatically select a level of immersion of the user according at least in part to a user preference. The story engine 220 can then instruct at least one user media device associated with the user to render at least one story stream according to the selected level of immersion. As an example, it is contemplated that the levels of immersion can vary along a gradient, such as from a light version having little or no user immersion where all of the events in a story are presented through a single user media device to a fully immersed version where at least two user media devices of the user could be used in a synchronized manner to more deeply immerse the user in the story. The more immersed versions can preferably include at least two types of media interactions including, for example, printing, faxing, texting, messaging, playing audio or video, making a phone call, emailing, receiving a voice mail, controlling a device, visiting a website, and changing a channel.

In some contemplated embodiments, the user can select a desired level of immersion by selecting one or more user media devices approved for use by the story engine 220. It is contemplated that the users could change or vary their immersion level over time, as desired, such as by adding or changing the user media devices permitted to be used by system 200. Alternatively or additionally, the registration engine 230 can be configured to detect at least one of a device class and a model of a user media device associated with the user. A list of the detected user media devices can then be populated for the user, or automatically selected to be used, as desired. It is contemplated that the registration engine 230 could also detect changes to the media devices associated with the user over time and vary a user's level of immersion accordingly. It is further contemplated that the registration engine 230 could adjust the user's level of immersion based at least in part on the device class or model of the user media device. This is important as different user media devices will likely have different capabilities and limitations, which can thus be identified and accounted for by the registration engine 230.

For example, if a user is associated with two user media devices, a laptop computer and a landline phone, the registration engine 230 could determine that any text messages in a story should be presented on the laptop computer as the user's landline is likely unable to receive such messages.

In further contemplated embodiments, the registration engine 230 could be configured to be contextually aware, such by detecting other information about a user. Such additional information could include, for example, a user's location, movement of a user, system information about associated user media devices (e.g., operating system, device components, ability to connect to cell network, etc.), time, day of the week, date, a length of time a user has interacted with the system continuously, and a user's internet access and bandwidth. The registration engine 230 could then adjust the user's level of immersion based at least in part on such information. For example, the registration engine 230 could adjust a user's level of immersion such that the user's level of immersion is reduced while the user is at work as compared with a user's level of immersion at home.

It is further contemplated that the level of immersion could be based on a device class selection, a device model selection, a media type, and a slider bar, for example.

It is especially preferred that the story engine 220 can be configured to alter at least one story stream as a function of the user's selected level of immersion. This ensures that the user will experience a seamless presentation of the story stream regardless of the selected level of immersion. In addition, such aspects allow the story engine to dynamically alter the at least one story stream to account for dynamic changes to a user's level of immersion over time.

The system 200 could also be configured to prompt the user to change the user's immersion level while the user is interacting with a story. Thus, for example, a user could be watching a character receive a text message and be prompted to enter the user's telephone number such that the user could receive the text message directly to the user's phone.

Figure 3:
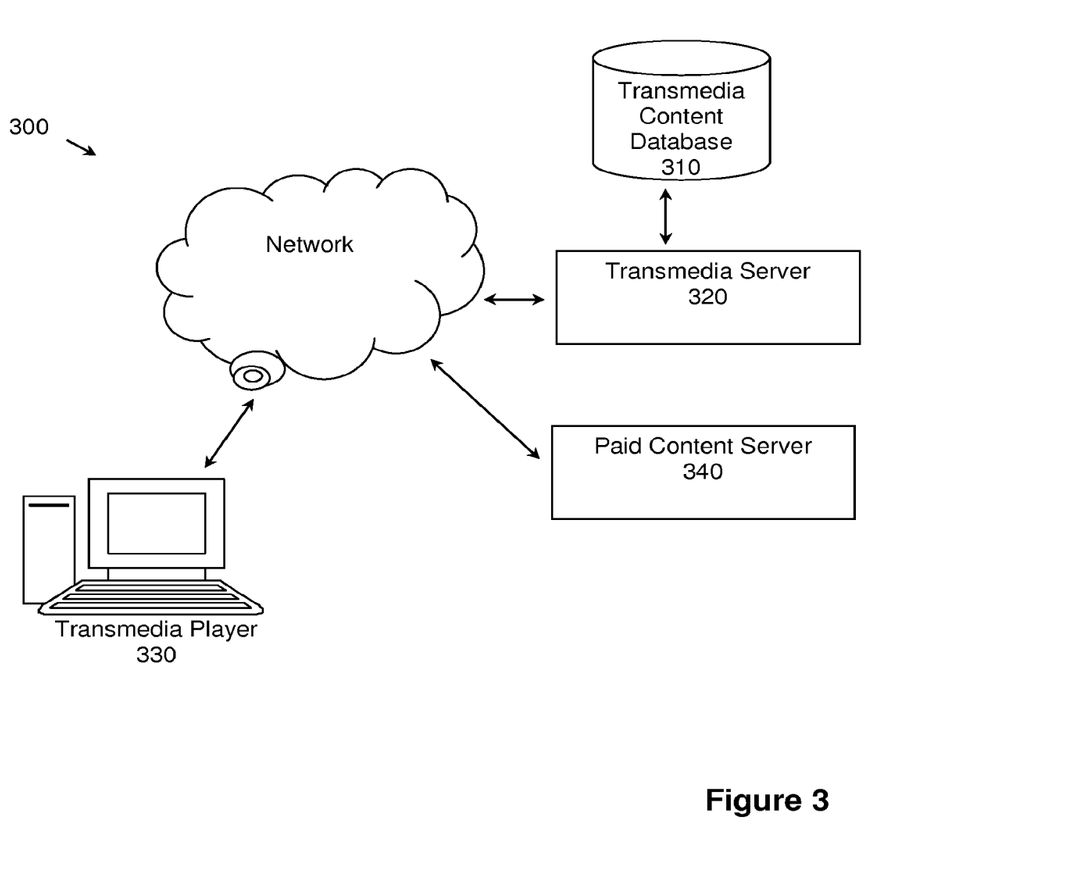
FIG. 3 is a schematic of one embodiment of a transmedia event management system.

In other aspects, a transmedia event management system 300 is contemplated, which includes a transmedia content database 310 storing a plurality of transmedia content. One embodiment of a transmedia event management system 300 is shown in FIG. 3.

Contemplated transmedia content can include, for example, a coupon, a map, a barcode, a telephone number, an email address, and a location photo.

The system can further include a transmedia server 320 coupled with the transmedia content database 310. The transmedia server 320 preferably is capable of constructing a transmedia progress bar having transmedia events, and that is based on at least some of the transmedia content. The transmedia events preferably comprise at least two types of media interactions including, for example, printing, faxing, texting, messaging, playing audio or video, making a phone call, emailing, receiving a voice mail, controlling a device, visiting a website, and changing a channel.

Preferred transmedia events can comprise an immersion level or achievement objects such as a trophy, a badge, a collectible, a currency, and an inventory object. It is contemplated that the achievement objects can be used to unlock additional content, whether virtual or associated with real-world items, people, or locations. Thus, for example, an achievement object could be used to unlock an additional chapter in a story, but may also be used to encourage the user to take some action in the real world including, for example, visiting a website or physical location, making a purchase, listening to a song, attending an event, and so forth. As another example, an achievement object could include a coupon that both provides a discount to a user for a product and when used unlocks additional content or inventory in a story.

Contemplated collectibles include inventory items, which could be presented to the user upon completion of some event, whether completing a chapter of a story, watching a portion of a story, or taking some other action. It is contemplated that a user could share or trade one or more of the collectibles with other users as desired. In other contemplated embodiments, a user could post the collectibles on a social media profile, for example. It is further contemplated that the collectibles could comprise or be associated with real-world items such as a coupon, directions, and so forth. The use of inventory items associated with real-world items is further described in co-pending U.S. utility application having U.S. Patent Application Publication No. 2013/0316452, filed on Sep. 13, 2012.

The system 300 could further connect to a social media website or profile of the user, and post or other link a user's progress in a story to a social media timeline.

The transmedia server 320 can configure a transmedia player 330 to render the transmedia progress bar concurrently with the transmedia content, such that the progress bar can be updated in real-time as a user interacts with the transmedia content. In this manner, the transmedia progress bar can be used to indicate to a user the user's progress within a story, for example. Such progress could include a chapter location, completed transmedia events, incomplete transmedia events, future transmedia events, past transmedia events, and other desirable features.

It is especially preferred that the transmedia player 330 could be configured to modify the transmedia progress bar upon detection of a completed transmedia event. Thus, for example, when a user completes a transmedia event, additional content could be unlocked and/or the completion of the event could be indicated in the progress bar.

In preferred embodiments, at least one user media device can be configured to display the transmedia progress bar concurrently with the story. In such embodiments, it is contemplated that the progress bar could be displayed on the same user media device or a different user media device than the story. As an example, a user could interact with a story on a laptop computer while the user's cell phone or tablet PC displays the transmedia progress bar showing the user's progress within the story.

It is further contemplated that the transmedia progress bar could be used to provide a quick reference point for a user where the user can view the events that the user completed and did not complete. This overview could be provided at the end of a story, at the end of a story's chapter, concurrently with the story content, or at any other desired point. The user could be given an opportunity to revisit the portions of the story and complete those events. For example, if a user selected to be presented with a light version of a story, the user could later modify the user's level of immersion such that the user could increase the amount of achievements and/or completed events.

The system 300 can also include a paid content server 340 coupled with the transmedia server 320, and configured to inject paid content within the transmedia events in exchange for a fee. The paid content preferably comprises at least one of the following: a promotion, a coupon, a collectible, an inventory object, and a currency, and especially includes paid transmedia content. Using the above examples, a business might pay for a transmedia event that requires a user to visit the merchant's website or physical store location to complete the event. The merchant or other advertiser might pay to inject the paid content on a subscription basis, pay-per-use basis, or any other commercially suitable basis.

Figure 4:
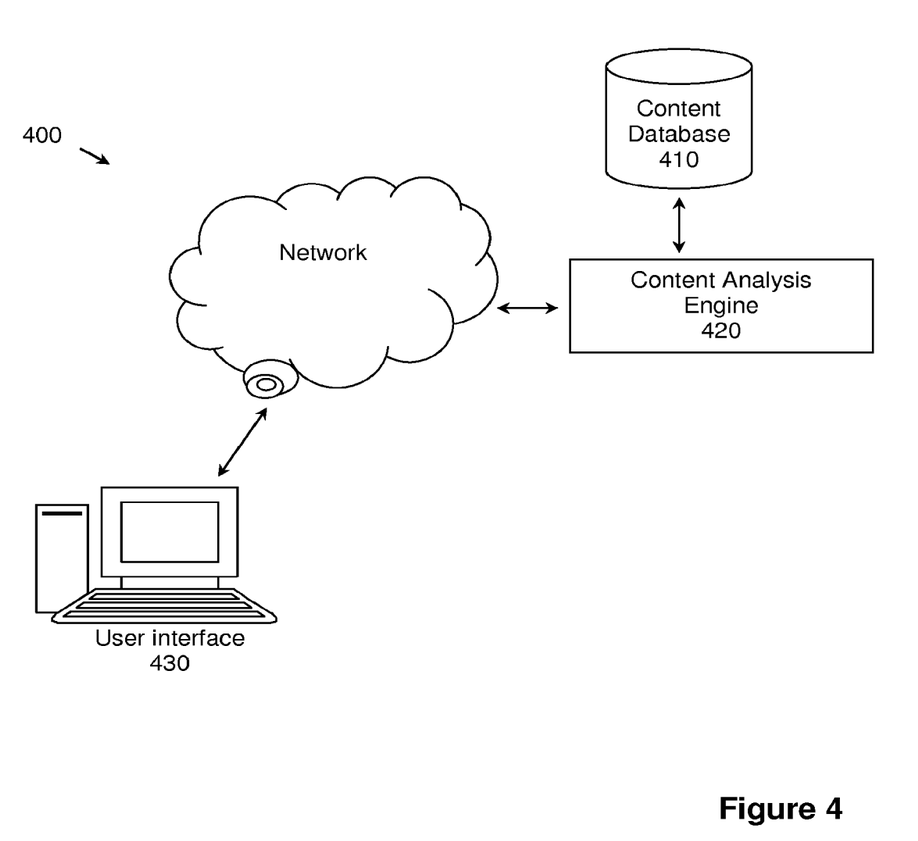
FIG. 4 is a schematic of one embodiment of a system configured to generate and manage content for a transmedia story.

In still other aspects, systems are contemplated that are configured to generate and manage content for a transmedia story, and one embodiment of such a system 400 is shown in FIG. 4. Such systems can include a content database 410 having a plurality of raw content streams, which preferably include a video stream having audio and video components, but could also include, for example, an audio stream, text, images, and content injection points. The raw content streams can include, for example, professional content, paid content, third-party content, and user-submitted content. In some embodiments, the third-party content could include content from a social media profile such as a timeline or other information. The user-created content could be content uploaded by a user or content created from a user's interaction with a transmedia story (e.g., a telephone call recording, a text, email or other message, a photograph, etc.).

A content analysis engine 420 can be coupled to the content database 410, and configured to detect one or more transmedia events within a raw content stream. The content analysis engine can then be used to construct at least one transmedia content object associated with the one or more transmedia events and the raw content stream. A transmedia story stream can then be generated that includes the at least one transmedia content object and at least a portion of the raw content stream. Preferred transmedia story streams comprise achievement objects including, for example, at least one of a trophy, a badge, a collectible, a currency, and an inventory object.

Thus, the system 400 can be configured to automatically identify content and then determine how and where to deliver that content based at least in part on information associated with the content. For example, a user could place a phone call as part of the user's interaction with a transmedia story, and all or some of the user's discussion could be parsed as content for a portion of the transmedia story, or another transmedia story entirely. The system 400 could be configured to recognize the audio as a conversation and associate one or more tags with the audio, and store the audio for later retrieval.

As another example, the system 400 could receive an email sent by the user to a character in the transmedia story and save all or a portion of the email message for later use. Again, it is contemplated that the system could associate one or more tags with the message for quick retrieval. Such tags may identify the user, the content of the message, an associated event in the story that required generation of the content, and so forth. All or part of the message could be used later in the transmedia story, such as by having the character read or respond to the user's message. In this manner, a user interacts with the game on another dimension, allowing the user to feel he or she is interacting with a character in the transmedia story.

In another example, a transmedia event in the transmedia story might require a user to take a picture of an outdoor location and submit it to the character in the transmedia story. The content analysis engine could receive the picture, and analyze the image using known image recognition techniques and geographical location information associated with the image to determine where the image was taken and whether there are any markers of value in the image. After analyzing the image, the content analysis engine might determine that the image should be delivered to a cell phone of the user but with an overlay that provides a clue to the user to unlock a next chapter in the transmedia story.

Still further, the raw content stream could comprise a video representing a series of character interactions in a transmedia story. The video could then be parsed to identify transmedia events, which are preferably delivered separately from the main video stream. As an example, in the video, a character may receive a telephone call from another character. Some or all of the conversation could be selected as a transmedia event, and converted into a transmedia story stream separate from the video stream, which could then be sent to a user's phone as a phone call at a predefined point in the transmedia story.

It is further contemplated that the content analysis engine 420 can be configured to modify the transmedia story stream according to a user preference.

In further contemplated embodiments, some or all of the above systems could include a content engine configured to extract or gather content from one or more social media profiles associated with a user. As an example, the content engine could access a user's Facebook™ profile and gather information about the user including likes, dislikes, location, social connections, status updates, subscriptions, travels, photos, and so forth. Other social media profiles include, for example, blogs, news articles, and public directories. This information could then be used to directly or indirectly affect paid or unpaid content within a transmedia story stream.

In a simplistic example, a user's profile picture from a social media profile associated with the user could directly affect story content by being inserted into a portion of the story by the content engine or other system component. However, content could also be varied in a more subtle manner, where, for example, a portion of a transmedia story stream could have music playing in the background that is chosen based on the user's taste. Thus, if a user likes or has attended a concert of a specific artist, that artist's music could be selected to be played. In this manner, a user could be further immersed in the story by increasing his or her comfort level.

In a similar fashion, content from a social media profile could be used to indirectly affect content of a transmedia story stream. In one example, advertising or other commercial information could be selected and delivered to a user media device based at least in part on the content gathered from the user's social media profile. Continuing with the musician example, if a user is determined to enjoy a specific genre of music, an advertisement about a new band in that genre could be displayed to the user. Alternatively, if a user "likes" a specific brand, advertisements for that brand or competing brands may be displayed to the user.

It is further contemplated that a transmedia story stream could be further customized based on the user media device where the content will be played, or the types or models of user media devices associated with a user. For example, if the system detects that a user is using an Apple™ operating system, an advertisement or other content could be adjusted to present content more likely to appeal to the user.

In other examples, the system could utilize user characteristics (e.g., profile information of a user), a user location, a time, a date, a type of user media device of the user, and so forth. Thus, for example, a video could be played where a television is playing in the background, and the advertisement played on the television is dynamically chosen based on at least one of the user characteristics and the user media device associated with the user.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A computer-implemented method of rendering content based on interactive game events, the method comprising:
    determining, via a media device, a geographic location of a user;
    requesting, via the media device and based on the geographic location of the user, at least one story object from a story database and associated with an interactive game, wherein the at least one story object comprises an interactive event and is associated with the geographic location of the user;
    injecting, via the media device, the at least one story object into at least one channel related to the interactive game;
    causing, via the media device, to render the at least one story object;
    rendering a progress bar representing completion of a plurality of interactive events within and associated with the interactive game, the plurality of interactive events comprising at least one or more messaging interaction events and one or more events that include controlling the media device and including the interactive event of the at least one story object that is associated with and requested based on the geographic location of the user; and
    updating the progress bar in real-time upon completion of the interactive event, the completion of the interactive event being in response to an interaction of the user with the at least one story object that is associated with and requested based on the geographic location of the user.

2. The method of claim 1, wherein the media device comprises a media player.

3. The method of claim 1, wherein the at least one story object comprises a transmedia story object.

4. The method of claim 2, wherein the media player is selected from the group consisting of: a desktop computer, a laptop, a netbook, a tablet PC, a portable computer, a cell phone, a video game system, an e-reader, a kiosk, a television, a vehicle, and an appliance.

5. The method of claim 1, wherein the geographic location comprises at least one of the following: an IP address, a postal code, a city, and a county.

6. The method of claim 1, wherein the geographic location is based on a movement of the user.

7. The method of claim 1, further comprising identifying an injection point within the at least one channel.

8. The method of claim 7, wherein the step of injecting the story object include injecting the story object at the injection point.

9. The method of claim 7, further comprising identifying the injection point based on the geographic location of the user.

10. The method of claim 7, further comprising identifying the injection point based on at least one of the following: a user profile, a time, a date, a user preference, and the media device.

11. The method of claim 1, wherein the geolocation of the user comprises a physical store location.

12. The method of claim 1, further comprising identifying advertising content based on the geolocation of the user.

13. The method of claim 12, further comprising injecting the advertising content into the at least one channel related to the interactive game.

14. The method of claim 13, further comprising injecting the advertising content at an injection point determined based on at least one of the following: a user characteristic, the geolocation of the user, a time, a data, and a type of media device.

15. The method of claim 1, wherein the story objects comprises a representation of at least one of the following: a trophy, a badge, a collectible, a currency, and an inventory object.

16. A non-transitory computer readable storage medium on which are stored software instructions executable by a processor to perform operations comprising:
- determining, via a media device, a geographic location of a user;
- requesting, via the media device and based on the geographic location of the user, at least one story object from a story database and associated with an interactive game, wherein the at least one story object comprises an interactive event and is associated with the geographic location of the user;
- injecting, via the media device, the at least one story object into at least one channel related to the interactive game;
- causing, via the media device, to render the at least one story object;
- rendering a progress bar representing completion of a plurality of interactive events within and associated with the interactive game, the plurality of interactive events comprising at least one or more messaging interaction events and one or more events that include controlling the media device and including the interactive event of the at least one story object that is associated with and requested based on the geographic location of the user; and
- updating the progress bar in real-time upon completion of the interactive event, the completion of the interactive event being in response to an interaction of the user with the at least one story object that is associated with and requested based on the geographic location of the user.

17. A computer-based interactive game apparatus comprising:
- a processor;
- a non-transitory computer readable storage medium on which are stored software instructions executable by a processor to perform operations comprising;
  - determining, via a media device, a geographic location of a user;
  - requesting, via the media device and based on the geographic location of the user, at least one story object from a story database and associated with an interactive game, wherein the at least one story object comprises an interactive event and is associated with the geographic location of the user;
  - injecting, via the media device, the at least one story object into at least one channel related to the interactive game;
  - causing, via the media device, to render the at least one story object;
  - rendering a progress bar representing completion of a plurality of interactive events within and associated with the interactive game, the plurality of interactive events comprising at least one or more messaging interaction events and one or more events that include controlling the media device and including the interactive event of the at least one story object that is associated with and requested based on the geographic location of the user; and
  - updating the progress bar in real-time upon completion of the interactive event, the completion of the interactive event being in response to an interaction of the user with the at least one story object that is associated with and requested based on the geographic location of the user.

* * * * *